(12) United States Patent
Suzuki et al.

(10) Patent No.: US 11,797,761 B2
(45) Date of Patent: Oct. 24, 2023

(54) DEVICE, METHOD AND PROGRAM FOR NATURAL LANGUAGE PROCESSING

(71) Applicants: NIPPON TELEGRAPH AND TELEPHONE CORPORATION, Chiyoda-ku (JP); TOHOKU UNIVERSITY, Sendai (JP)

(72) Inventors: Jun Suzuki, Musashino (JP); Sho Takase, Musashino (JP); Kentaro Inui, Miyagi (JP); Naoaki Okazaki, Miyagi (JP); Shun Kiyono, Miyagi (JP)

(73) Assignees: NIPPON TELEGRAPH AND TELEPHONE CORPORATION, Chiyoda-ku (JP); TOHOKU UNIVERSITY, Sendai (JP)

( * ) Notice: Subject to any disclaimer, the term of this patent is extended or adjusted under 35 U.S.C. 154(b) by 310 days.

(21) Appl. No.: 16/975,312

(22) PCT Filed: Jun. 25, 2018

(86) PCT No.: PCT/JP2018/023961
§ 371 (c)(1),
(2) Date: Aug. 24, 2020

(87) PCT Pub. No.: WO2019/167296
PCT Pub. Date: Sep. 6, 2019

(65) Prior Publication Data
US 2021/0406483 A1    Dec. 30, 2021

(30) Foreign Application Priority Data

Feb. 28, 2018 (JP) ................................ 2018-034781

(51) Int. Cl.
*G06F 17/00* (2019.01)
*G06F 40/20* (2020.01)
(Continued)

(52) U.S. Cl.
CPC ............ *G06F 40/20* (2020.01); *G06F 40/279* (2020.01); *G06F 40/58* (2020.01)

(58) Field of Classification Search
None
See application file for complete search history.

(56) References Cited

U.S. PATENT DOCUMENTS

2017/0068665 A1 * 3/2017 Tamura ................... G06F 40/44

FOREIGN PATENT DOCUMENTS

WO   WO-2016065327 A1 * 4/2016 ........... G06F 40/242

OTHER PUBLICATIONS

Rush, Alexander M., et al., "Neural Attention Model for Abstractive Sentence Summarization", Proceedings of the 2015 Conference on Empirical Methods in Natural Language Processing (EMNLP 2015), 2015, pp. 379-389.

(Continued)

*Primary Examiner* — Satwant K Singh
(74) *Attorney, Agent, or Firm* — Oblon, McClelland, Maier & Neustadt, L.L.P.

(57) ABSTRACT

Disclosed is a natural language processing technique according to a neural network of high interpretive ability. One embodiment of the present disclosure relates to an apparatus including a trained neural network into which first natural language text is input and that is trained to output second natural language text and alignment information, the second natural language text being in accordance with a predetermined purpose corresponding to the first natural language text, and the alignment information indicating, for each part of the second natural language text, which part of the first natural language text is a basis of information for generation; and an analyzing unit configured to output, upon input text being input into the trained neural network, a predicted result of output text in accordance with a predetermined (Continued)

purpose, and alignment information indicating, for each part of the predicted result of the output text, which part of the input text is a basis of information for generation.

9 Claims, 12 Drawing Sheets

(51) Int. Cl.
*G06F 40/279* (2020.01)
*G06F 40/58* (2020.01)

(56) References Cited

OTHER PUBLICATIONS

International Search Report dated Sep. 25, 2018 in PCT/JP2018/023961 filed on Jun. 25, 2018.

* cited by examiner

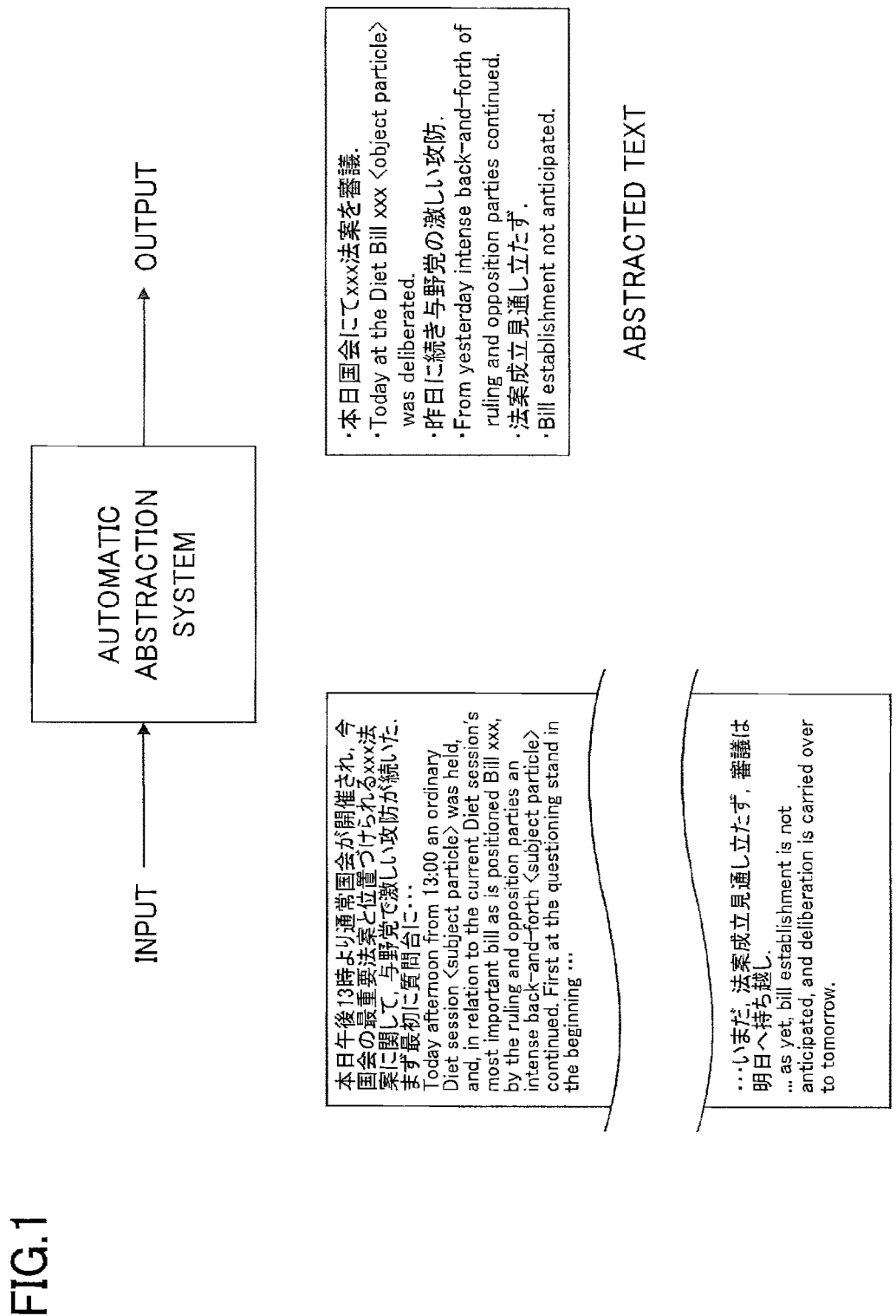

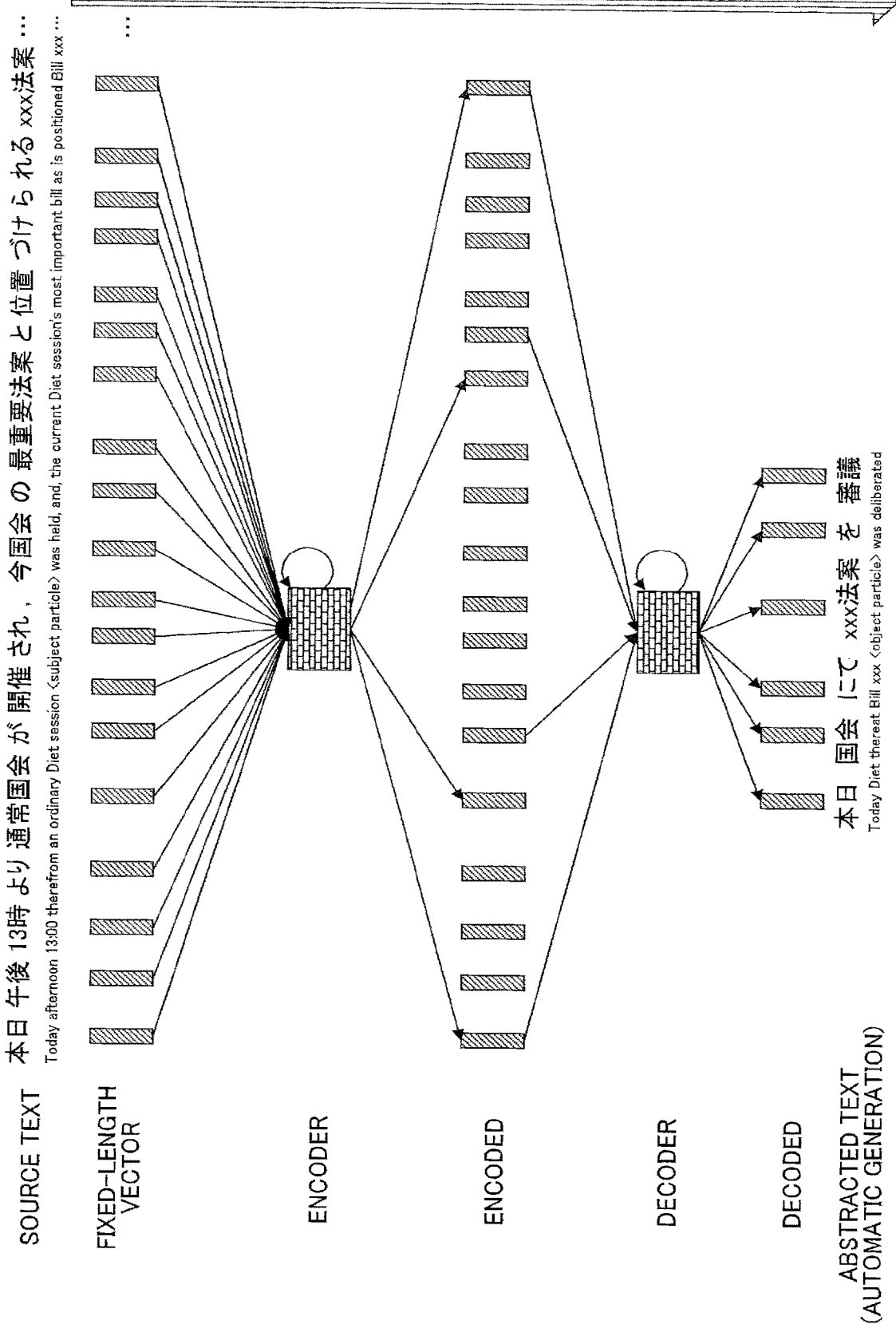

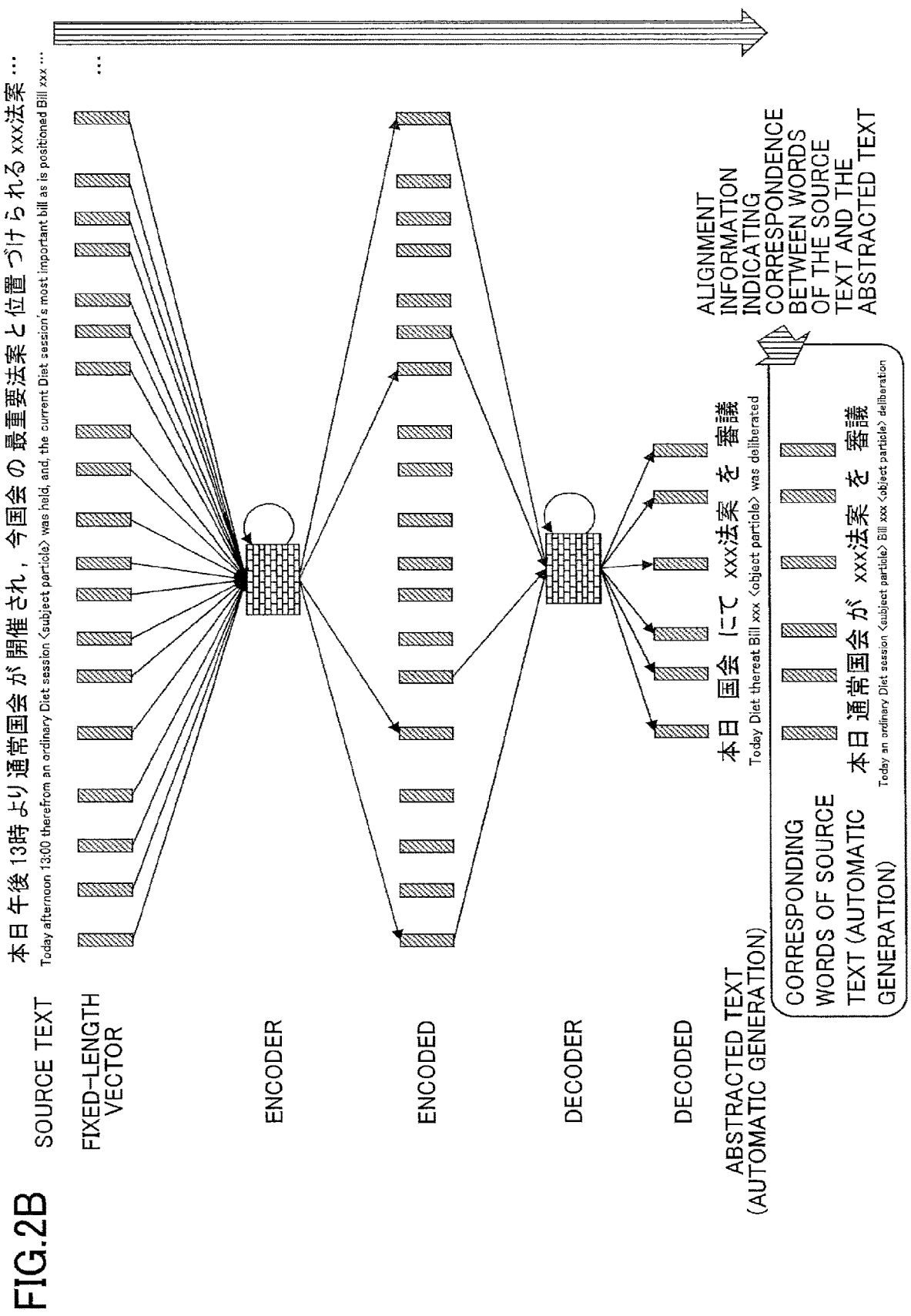

FIG.9

SOURCE INPUT TEXT

本日午後13時より通常国会が開催され、今国会の最重要法案と位置づけられるxxx法案…

Today afternoon 13:00 therefrom an ordinary Diet session <subject particle> was held, and, the current Diet session's most important bill as is positioned Bill xxx …

CHARACTER UNITS

本|日|午|後|1|3|時|よ|り|通|常|国|会|が|開|催|さ|れ|,|今|国|会|の|最|重|…

Present|Day|Noon|After|1|3|O'clock|yo|ri|Through|Always|National|Assembly|<subject particle>|Open|Take place|sa|re|,|Current|National|Assembly|'s|Most|important|…

MORPHEME UNITS

本日|午後|13時|より|通常国会|が|開催|され|,|今国会|の|最重要法案|と|…

Today|Afternoon|13:00|From|Ordinary Diet session|<subject particle>|To hold|was -eld|,|Current Diet session|'s|Most important bill|As|…

DEVICE, METHOD AND PROGRAM FOR NATURAL LANGUAGE PROCESSING

TECHNICAL FIELD

The present disclosure generally relates to natural language processing, and specifically relates to natural language processing using artificial intelligence.

BACKGROUND OF THE INVENTION

The natural language processing techniques that are the object of the present invention are techniques for a computer to automatically generate specified output text from text that is input. For example, automatic abstraction, machine translation, dialogue text generation and the like are known. In the case of automatic abstraction, the text of an abstract, in which input text is abstracted, is the output text. Additionally, in the case of machine translation, the text of a translation, in which input text is translated into a target language, is the output text. Additionally, in the case of dialogue text generation, when spoken text is taken as input text, response text corresponding to the spoken text is the output text.

As a natural language processing technique using neural networks, Non-Patent Document 1 is known. In Non-Patent Document 1, there is disclosure of an automatic abstraction method generating automatic abstracted text that is easily person-readable and that is short, using neural networks that have been trained to allow for generating output text using words and phrasing not included in the input text.

RELATED ART DOCUMENT

Non-Patent Document

[Non-Patent Document 1] Rush, Alexander M. and Chopra, Sumit and Weston, Jason, "Neural Attention Model for Abstractive Sentence Summarization", Proceedings of the 2015 Conference on Empirical Methods in Natural Language Processing (EMNLP 2015)

SUMMARY OF THE INVENTION

Problem to be Solved by the Invention

In natural language processing using conventional neural networks of Non-Patent Document 1, it is difficult for a person to understand the process (internal process) by which output text is generated from input text. For example, in Non-Patent Document 1, it is difficult for a person to grasp, for each substring in the input text, which of the substrings in the output text is the corresponding one.

In view of the above problem at issue, one problem to be solved of the present disclosure is to provide a natural language processing technique by neural networks of high interpretability.

Means for Solving the Problem

To solve the above problem, one embodiment of the present disclosure relates to an apparatus including a trained neural network into which first natural language text is input and that is trained to output second natural language text and alignment information, the second natural language text being in accordance with a predetermined purpose corresponding to the first natural language text, and the alignment information indicating, for each part of the second natural language text, which part of the first natural language text is a basis of information for generation; and an analyzing unit configured to output, upon input text being input into the trained neural network, a predicted result of output text in accordance with a predetermined purpose, and alignment information indicating, for each part of the predicted result of the output text, which part of the input text is a basis of information for generation.

Advantage of the Invention

According to the present disclosure, in a language processing technique using a neural network, output of high interpretability can be provided.

BRIEF DESCRIPTION OF THE DRAWINGS

FIG. 1 is a conceptual diagram of an automatic abstraction process.

FIG. 2A is a schematic drawing illustrating a generation-type automatic abstraction system based on a neural network.

FIG. 2B is a schematic drawing illustrating an automatic abstraction system according to a trained model according to an embodiment of the present disclosure.

FIG. 9 is a diagram illustrating a specific example of a segmenting process of text into processing units according to the embodiment of the present disclosure.

EMBODIMENTS OF THE INVENTION

In the below embodiment, a device using a neural network to execute natural language processing such as automatic abstraction, machine translation, and dialogue text creation is disclosed. Such natural language processing can generally be explained as a process converting text that is input to output text that has met a specified purpose. Here, both of text that is input (hereinafter may also be termed "input text") and output text are assumed to consist of one or more sentences. If automatic abstraction, the output text is text produced by abstracting input text into text of shorter length than the input text. If machine translation, the output text is text produced by translating input text into a target language (such as English, Japanese, and Chinese). If dialogue text creation, the output text is response text corresponding to dialogue text that is input text.

FIG. 1 is a conceptual diagram of a general automatic abstraction process. Here, in the case of Japanese-language text being given as input, text (abstracted text) produced by abstracting the input text within a specified number of characters in Japanese is output, as the abstracted text.

An example of automatic abstraction based on a typical neural network is described using FIG. 2. Note that Japanese-language text is taken for the example sentence here. First, input text is segmented into specified processing units and changed to fixed-length vectors for each processing unit. Next, an encoder encodes the segmented vectors and outputs intermediate states (codes). Then, a decoder, by decoding codes generated by the encoder, generates output text (abstracted text in this example). Here, the encoder and the decoder are realized by a neural network. In this way, in natural language processing based on conventional neural networks, only output text is output with respect to input text.

Figure 3:
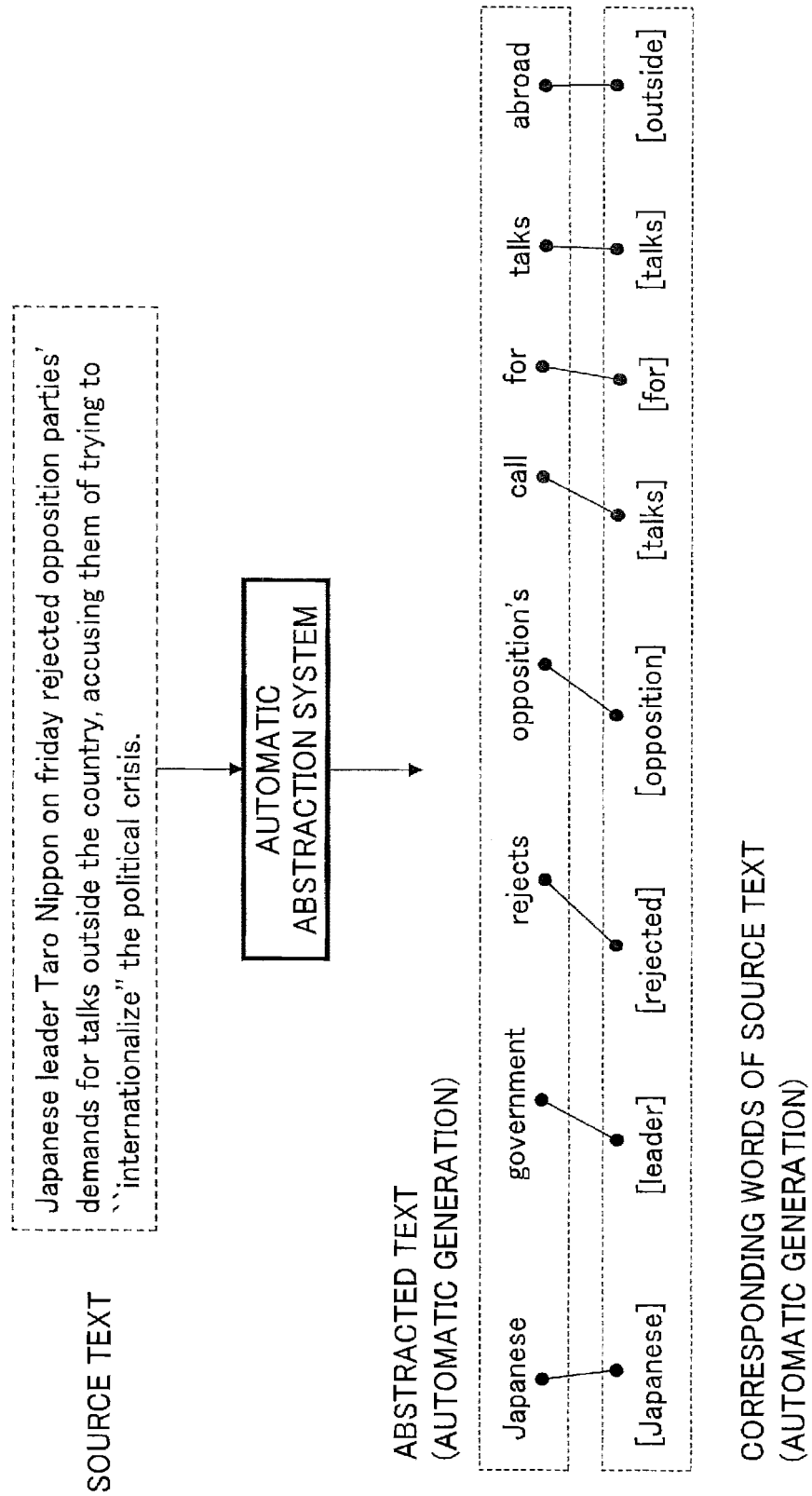
FIG. 3 is a schematic drawing illustrating an automatic abstraction system according to the trained model according to the embodiment of the present disclosure.

In contrast, in the automatic abstraction according to an embodiment of the present disclosure, as illustrated in FIG. 2B and FIG. 3, information (alignment) illustrating the correspondence between each part in the input text and each part in the output text is output, along with input text. In this example, alignment is information illustrating the correspondence of substrings in the input text with substrings in the output text. With this arrangement, for each substring of the output text that is the output text of the neural network, the user is easily able to identify which of the substrings of the input text is the basis for generation. Accordingly, it becomes easy for a person to correct output text, and to adjust neural network configuration and such, such that output text of higher quality can be output from the neural network.

<Text Generation Device 100>

First, in referring to FIGS. 4 to 7, a text generation device according to an embodiment of the present disclosure is described.

Figure 4:
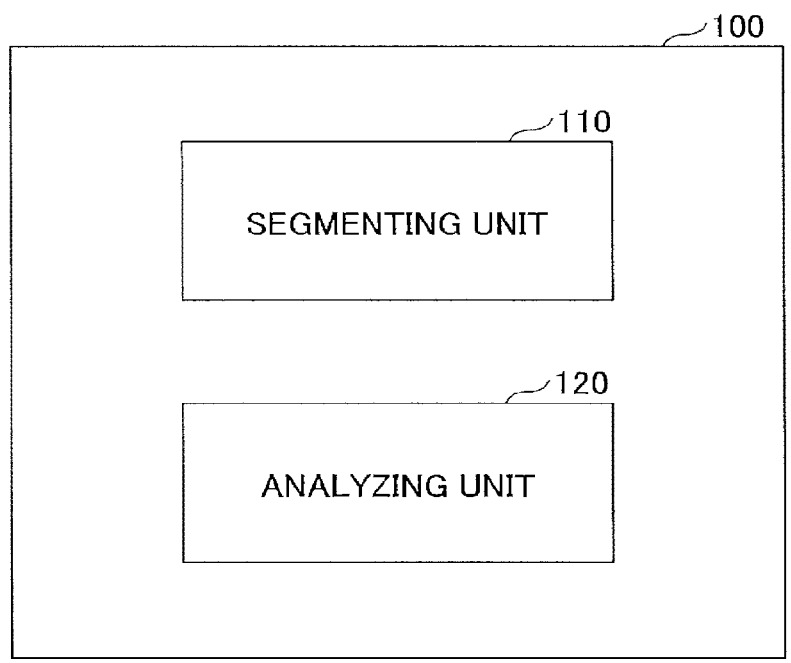
FIG. 4 is a block diagram illustrating a configuration of a text generation device according to the embodiment of the present disclosure.

FIG. 4 is a block diagram illustrating a configuration of a text generation device according to the embodiment of the present disclosure. The text generation device 100 includes a segmenting unit 110 and an analyzing unit 120.

The segmenting unit 110 reads input text, and outputs the text segmented with respect to any processing unit defined beforehand. Here, a processing unit is, for example, a word in English-language text, one character in Japanese- or Chinese-language text, or a morpheme and such.

The analyzing unit 120, using a trained neural network, generates a predicted result of output text (hereinafter, may also be termed "predicted output text") in accordance with a specified purpose from input text and alignment information. Here, alignment information is information that specifies, for each part of the predicted output text, which part of the input text is a basis of information for generation.

The trained neural network used in the analyzing unit 120 is one that is trained beforehand so as to output, when first natural language text is input, (1) a predicted result of second natural language text in accordance with a specified purpose corresponding to the first natural language text, and (2) alignment information that is information specifying correspondence between the first natural language text and the predicted result of the second natural language text. Here, the alignment information is information specifying, for each part included in the predicted result of the second natural language text, which part of the first natural language text is a basis of information for generation. For example, if automatic abstraction, the information specifies, for each part of the abstracted text, which part of the input text is abstracted. If machine translation, the information specifies, for each part (e.g. word) of the translated text, which part (e.g., word) of the input text corresponds in translation.

Alternatively, in the case of dialogue text generation, the information specifies, for each part of the generated response text, which part of the dialogue text that is the input text is the basis for generation.

Note that the trained neural network used in the analyzing unit 120 learns each parameter of the neural network beforehand such as from the later-described learning device 130, and the values of each parameter that are the learning results are referred to as the set neural network. In other words, in the analyzing unit 120, by input text being input into the trained neural network, predicted output text and alignment information are output.

Figure 5:
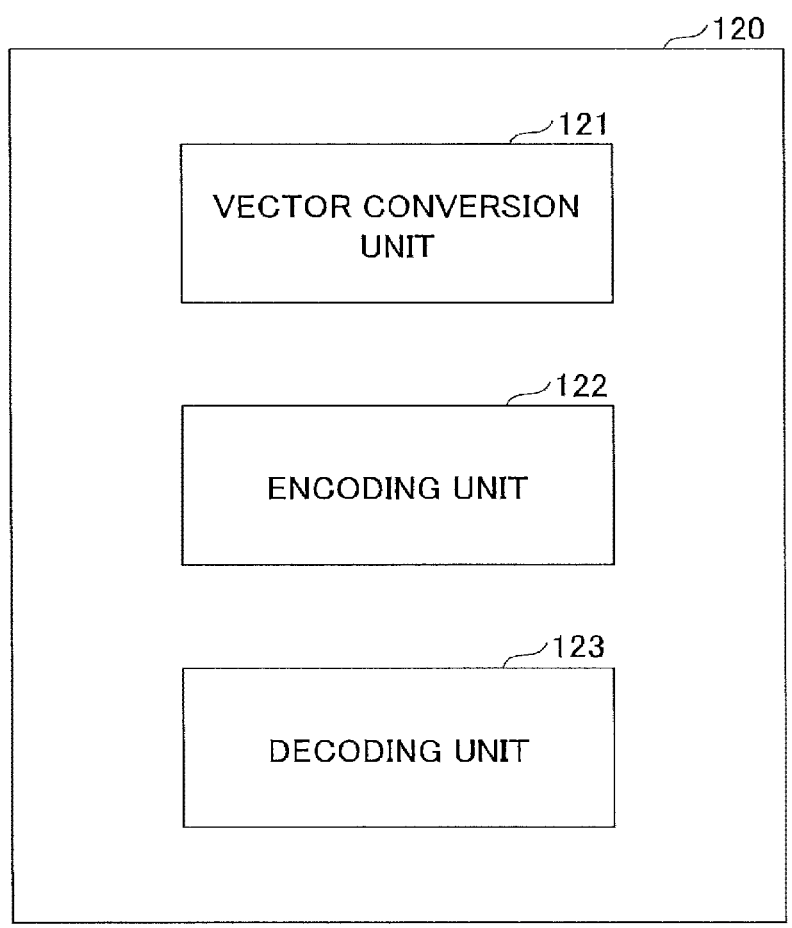
FIG. 5 is a block diagram illustrating a configuration of an analyzing unit according to the embodiment of the present disclosure.

More specifically, the analyzing unit 120, as illustrated in FIG. 5, includes a vector conversion unit 121, an encoding unit 122, and a decoding unit 123. The encoding unit 122 and the decoding unit 123 are constituent elements of the neural network. Although the neural network here is described assuming an encoder-decoder model, the neural network used in the present invention is not limited to this. The encoder-decoder model is a neural network constituted by a neural network (this is termed "an encoder") having a function of converting information corresponding to text to intermediate states (vector sequences, may also be termed intermediate output) and by a neural network (this is termed "a decoder") having a function of converting the intermediate output to text. Each parameter of the neural network is set with learned values based on previous learning data, by the later-described learning device 130 or the like, and left as is.

When input text segmented into processing units (hereinafter termed "unit input text") is input, the vector conversion unit 121 converts, for each processing unit, the unit input text into N-dimensional vectors. Here, N is a natural number. Hereinafter, a list that juxtaposes vector representation for each processing unit is called an "input vector".

The encoding unit 122 converts the input vector to intermediate output, by the encoder of the trained neural network.

The decoding unit 123 converts the intermediate output that is output by the encoding unit 122 to two output vectors, by the decoder of the trained neural network. Then, it generates and outputs each of, a predicted result of output text based on one of the output vectors and alignment information based on the other of the output vectors.

Figure 7:
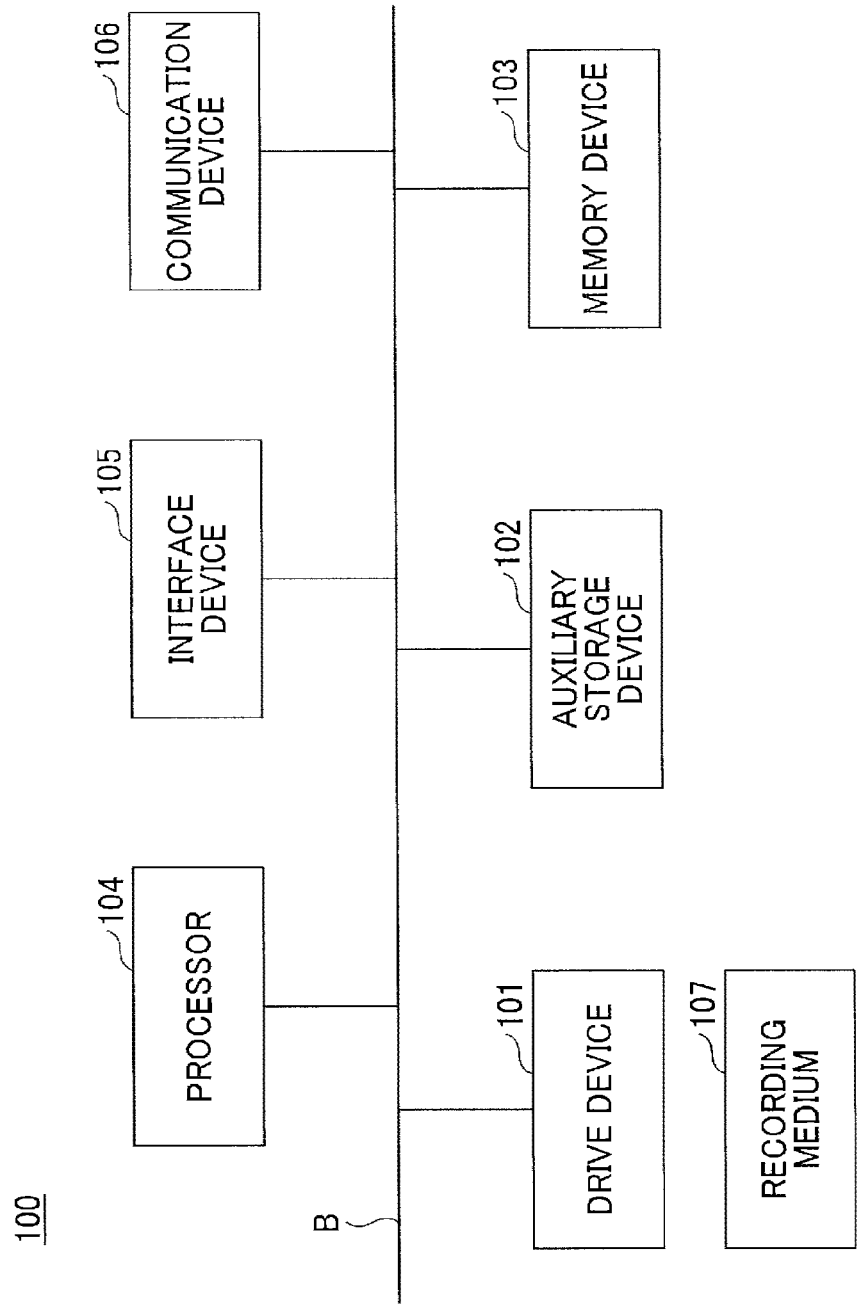
FIG. 7 is a block diagram illustrating a hardware configuration of the text generation device according to the embodiment of the present disclosure.

Note that the text generation device 100, typically, may be implemented by an arithmetic apparatus such as a server, and for example, as illustrated in FIG. 7, may be configured from a drive device 101, an auxiliary storage device 102, a memory device 103, a processor 104, an interface device 105, and a communication device 106 mutually interconnected through a bus B. The various computer programs including the programs implementing the later-described various functions and processes in the text generation device 100 may be provided by a recording medium 107 such as a CD-ROM (Compact Disk-Read Only Memory), DVD (Digital Versatile Disk), and flash memory. When the recording medium 107 in which the programs are stored is set in the drive device 101, the programs are installed in the auxiliary storage device 102 from the recording medium 107 through the drive device 101. However, the programs are not necessarily installed from the recording medium 107, and may be downloaded from any external apparatus through a network and the like. The auxiliary storage device 102 stores necessary files, folders, and such along with storing the installed programs. The memory device 103 reads out and stores the programs and data from the auxiliary storage device 102 in response to a program start command. The processor 104 executes the later-described various functions and processes of the text generation device 100, in accordance with programs stored in the memory device 103 or various data such as necessary parameters for executing the programs. The interface device 105 is used as a communication interface for connecting to a network or an external device. The communication device 106 executes various communication processes for communicating with a network such as the Internet.

However, the text generation device 100 is not limited to the hardware configuration described above, and may be implemented by any other suitable hardware configuration.

[Text Generation Process]

Next, referring to FIGS. 8 and 9, a text generation process using the trained neural network according to the embodiment of the present disclosure will be described.

Figure 8:
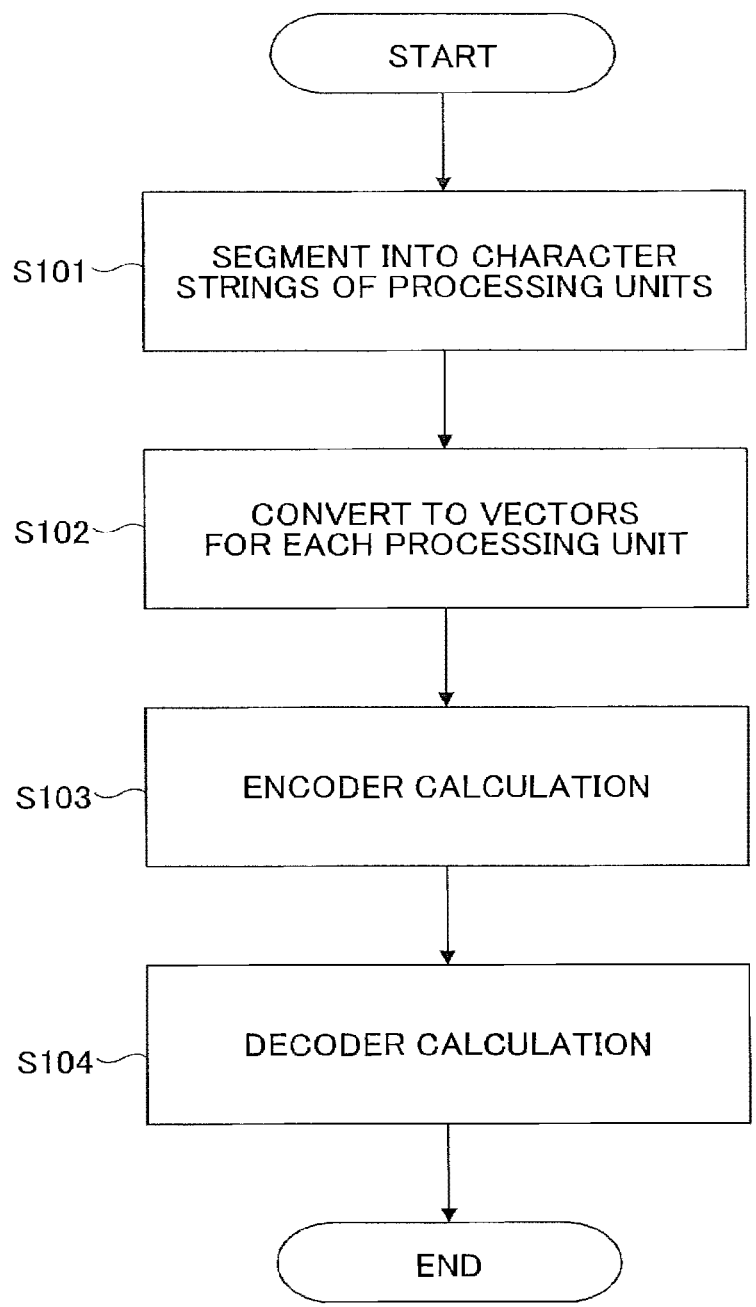
FIG. 8 is a flowchart illustrating a text generation process according to the embodiment of the present disclosure.

FIG. 8 is a flowchart illustrating a text generation process according to the embodiment of the present disclosure. The process, as will be described in detail below, is executed by the text generation device 100, more specifically, by the processor of the text generation device 100. The input text is text or writing described through natural language, and, for example, may be an entire news article and such. Additionally, it may be text that is a speech recognition result.

In Step S101, the text generation device 100 segments input text with respect to any processing unit defined beforehand. For example, for English-language text, it segments according to blank spaces (spaces). In this case, the processing unit is a word. Additionally, the processing unit may be defined as a one-character unit; in this case, it is also possible to accommodate writing from languages in which word separations are not specified by blank spaces, such as Japanese and Chinese. Apart from such simple segmenting methods, it is also possible to set, as the processing units, morphemes using a morphological analysis system. For any method, the processing unit is selected by human means such as an administrator of the text generation device 100, and is set beforehand.

In this manner, the text generation device 100, for example, as illustrated in FIG. 9, outputs text generated by segmenting input text with respect to any processing unit determined beforehand.

In Step S102, the text generation device 100 obtains vectors corresponding to respective processing units, for the text segmented into processing units. For description, the string that is the i-th processing unit in the input text is taken as $w_i$, the number of segments of the input text being taken as I, and the input text is taken as a list of strings $w_i$ for each processing unit $$(w_i)_{i=1}^{I} = (W_1, \ldots, W_I) \qquad [\text{Math. 1}]$$

for expressing the above.

In step S102, the text generation device 100 generates a vector $x_i$ corresponding to string $w_i$, based on the string $w_i$ for each processing unit. The vector $x_i$ expresses the feature of the string by an N-dimensional vector, and expresses, in vector representation, which one from among a set of vocabulary words (words and such, predetermined processing units) prepared beforehand corresponds to the string. For example, with the number of vocabulary words in a set of vocabulary words Φ being taken as N, in the case of $w_i$ corresponding to an n-th vocabulary word in the set of vocabulary words Φ, vector $x_i$ is an N-dimensional one-hot vector in which the n-th element is 1 and all other elements are 0.

Figure 10:
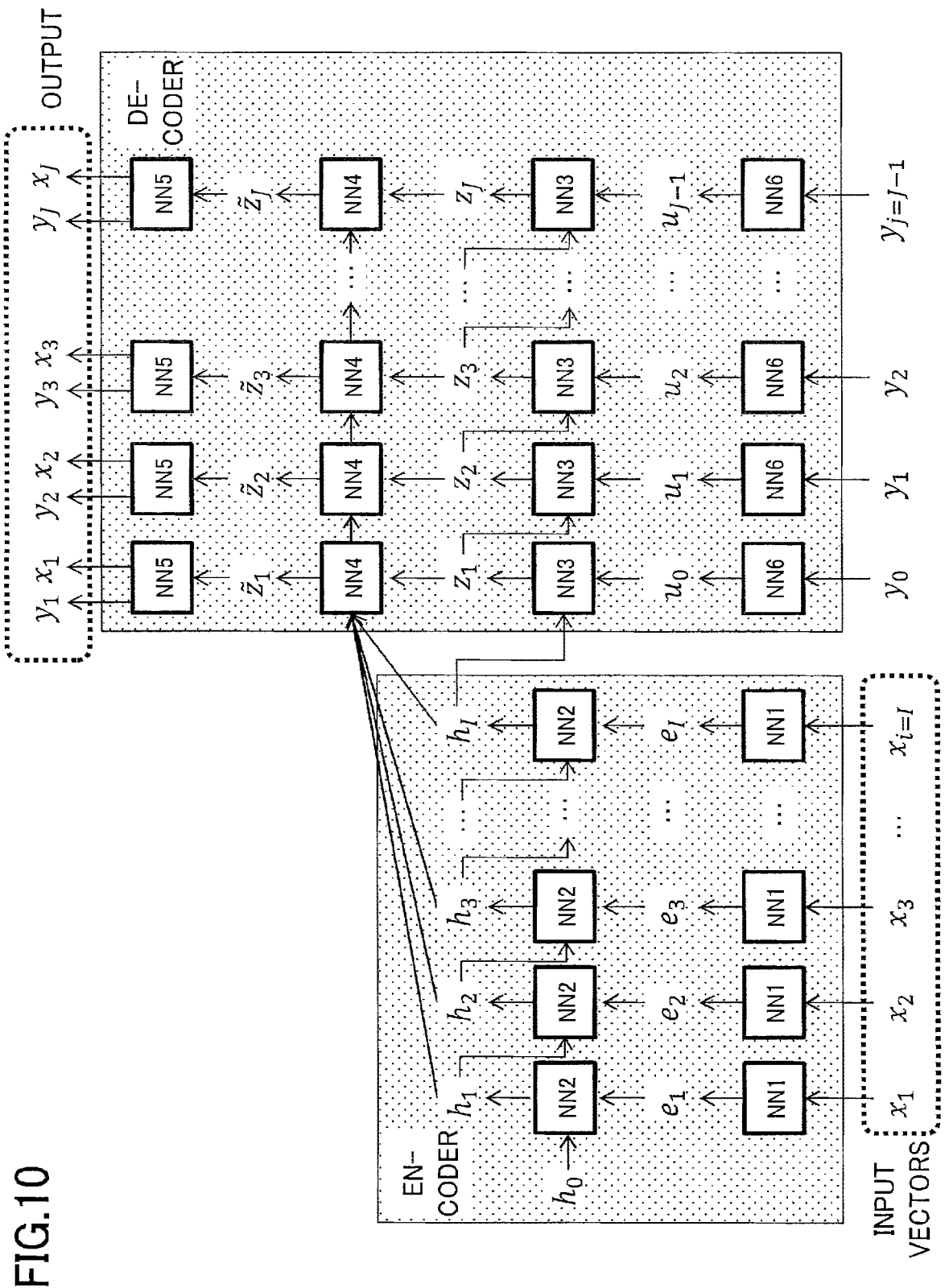
FIG. 10 is an image drawing representing a process flow by the analyzing unit.

The process hereafter will be described while referring to FIG. 10. FIG. 10 is an image illustrating a process flow according to the analyzing unit 120. Note that the configuration illustrated here is an example, and the configuration of the neural network is not limited to this.

The text generation device 100 converts the vector $x_i$ to a D-dimensional vector $e_i$ through the neural network (NN1 in FIG. 10). $e_i$ is obtained by converting $x_i$ to a real number-value vector of predetermined dimension (D dimension) (word embedding). This conversion process can be expressed by the formula below.

[Math. 2]

$$e_i = E x_i \qquad (1)$$

Here, E is a matrix of dimension D×N, and $e_i$ is a D-dimensional vector. Note that, within the neural network (specifically the neural network corresponding to the encoder), E is information specifying the layer converting $x_i$ to $e_i$, that is, a matrix holding parameters of the neural network as values. In the present embodiment, E is a fixed matrix to which the values of previously learned parameters are set. D is any natural number. Although the conversion here is described as being performed based on a trained neural network, conversion may be performed using a dictionary (codebook) consisting of sets of {processing unit, vector corresponding to the processing unit} prepared according to a described method as in the reference literature "Tomas Mikolov, Ilya Sutskever, Kai Chen, Greg Corrado, and Jeffrey Dean. Distributed Representations of Words and Phrases and their Compositionality. In Proceedings of NIPS, 2013.". The vectors output in Step S102 are expressed as below.

$$(e_i)_{i=1}^{I} = (e_1, \ldots, e_I) \qquad [\text{Math. 3}]$$

In Step S103, the text generation device 100 generates a list of hidden states (vectors) that are intermediate output, by utilizing a neural network to convert vectors sequentially from the first in the list of vectors obtained in Step S102.

In the present embodiment, a process is described by referring to FIG. 10, with a case of using LSTM (Long Short-Term Memory) for the encoder. However, the configuration of the encoder is not limited to this.

The LSTMs perform conversion by the neural network (NN2 in FIG. 10) sequentially from $e_1$, the first of the list of input vectors $e_1$. With $h_i$ representing the hidden state that is obtained by converting the i-th input vector $e_1$, conversion result $h_1$ is firstly generated by inputting $e_1$ and $h_0$ in the neural network, and conversion result $h_2$ is obtained next by inputting $e_2$ and $h_1$ in the neural network. Similarly, $h_i$ is obtained by the neural network converting $e_i$ and $h_{i-1}$ in the order of $i=3, 4, \ldots, I$. Here, for $h_o$, an H-dimensional vector with suitable values initially set beforehand may be used.

Here, additionally, $W_1$, $W_2$, $W_3$, $W_4$, $V_1$, $V_2$, $V_3$, $V_4$ are taken as parameters of the neural network that can be learned. Each of $W_1$, $W_2$, $W_3$, $W_4$ is an H×D matrix (H is any natural number). Each of $V_1$, $V_2$, $V_3$, $V_4$ is an H×H matrix. In the present embodiment, these parameters are previously learned, that is, it is assumed that the value of each element of the matrices is already fixed. Additionally, each of $b_1$, $b_2$, $b_3$, $b_4$ is an H-dimensional bias vector. These are also parameters of the neural network that can be learned, and assumed to be previously learned in the present embodiment. Thereupon, the calculating process in the LSTM can be described as below. That is, in Step S103, the text generation device 100 sequentially generates the hidden states $h_1$ by sequentially executing the formulas below from $e_1$, the first of the list of vectors obtained in Step S102.

[Math. 4]

$$c_i \leftarrow u \odot g + f \odot c_{i-1}$$

$$u = \sigma_2(W_1 e_i + V_1 h_{i-1} + b_1)$$

$$g = \sigma_1(W_2 e_i + V_2 h_{i-1} + b_2)$$

$$f = \sigma_1(W_3 e_i + V_3 h_{i-1} + b_3)$$

$$h_i \leftarrow q \odot \sigma_2(c_i)$$

$$q = \sigma_1(W_4 e_i + V_4 h_{i-1} + b_4) \qquad (2)$$

Here, $$\odot \qquad \text{[Math. 5]}$$

represents the element-wise product of respective vectors. Additionally, $\sigma_1(x)$ and $\sigma_2(x)$ are activation functions, with a vector x taken as input, converting to a vector of same dimension as vector x. For example, when the i-th element of x is taken as element $x_i$, and the i-th element of $\sigma_1(x)$ is taken as $\sigma_1(x_i)$, $\sigma_1(x_i)$ is the sigmoid function value of $x_i$ as illustrated in the formula below.

[Math. 6]

$$\frac{1}{1 + \exp(-ax_i)}$$

Here, a is the gain of the sigmoid function and is a previously set value larger than 0. Similarly, when the i-th element of $\sigma_2$ (x) is taken as $\sigma_2(x_i)$, $\sigma_2(x_i)$ is the tan h function value of $x_i$ as illustrated in the formula below.

[Math. 7]

$$\frac{2}{1 + \exp(-2ax)} - 1$$

Note that the activation functions $\sigma_1(x)$ and $\sigma_2(x)$ are not limited to these, and may be set as desired. Let the list of hidden states $h_i$ generated in Step S103 be expressed as below.

$$(h_i)_{i=1}{}^I = (h_1, \ldots, h_I) \qquad \text{[Math. 8]}$$

In Step S104, the text generation device 100 generates predicted output text by inputting the list of hidden states $h_i$ into the decoder. Specifically, by using, in the network, intermediate output obtained in Step S103 and predicted output regarding learned processing units in the past, it generates predicted output text of the next processing units.

In the present embodiment, a process is described by referring to FIG. 10, with a case of using LSTM (Long Short-Term Memory) similar to the encoder, as a configuration for the decoder. However, the configuration of the decoder is not limited to this.

The decoder includes LSTMs (NN3 in FIG. 10) generating intermediate output and a neural network for predicting output text from the intermediate output (NN4~NN5 in FIG. 10).

First, the process by LSTMs generating intermediate output is described. With respect to the LSTM part, apart from the point of using $u_j$ in place of $e_i$ in the encoder, and $z_j$ in place of $h_i$, the configuration is basically the same as in the encoder. Here, $u_j$ is a vector expression corresponding to a predicted result yj of a j-th processing unit of predicted output text. For $u_0$, a vector expression corresponding to a symbol for representing the beginning of text is used. Additionally, let the last intermediate output $h_I$ of the encoder be taken as $z_0$.

First, with the hidden state $h_I$ output from the encoder and $u_o$ being input into the network (NN3 in FIG. 10), the hidden state $z_1$ is generated. Then, with the hidden states $h_1, \ldots, h_I$ generated by the encoder and $z_1$ being input into the network (NN4 in FIG. 10), the hidden state $\bar{z}_1$ is generated. Then, from the hidden state $\bar{z}_1$ the predicted result $y_1$ of the first processing unit of output text and the predicted result $x_1$ of the input text processing unit that became the source of generating $y_1$ are determined. Then, the predicted result $y_1$ of the first processing unit is converted to a vector $u_1$ of predetermined dimension by the neural network (NN6 in FIG. 10). Note that ⁻ and ^ are symbols that are displayed above z or y.

Similarly, in the sequence of j=2, 3, ..., J–1, by inputting vector expression $u_{j-1}$ corresponding to $y_{j-1}$ and hidden state $z_{j-1}$ into the neural network, the hidden state $z_j$ is determined. Here, J is the number of processing units (number of segments) included in the predicted output text. Then, by inputting the hidden states h1, ..., hI generated by the encoder and $z_j$ into the network (NN4 in FIG. 10), the hidden state $\bar{z}_j$ is generated. Then, from the hidden state $\bar{z}_j$ the predicted result $y_j$ of the i-tb processing unit of predicted output text and the processing unit $x_j$ of the input-side text that became the source of generating $y_j$ are determined. Then, the predicted output $y_j$ of the j-th processing unit is converted to a vector $u_j$ of predetermined dimension by the neural network (NN6 in FIG. 10).

Here, the vector expression $u_j$ corresponding to $y_j$ is a D-dimensional vector. When the parameters specifying the layer of the neural network converting $y_j$ to $u_j$ are expressed by a matrix F of dimension D×K, this conversion is expressed by the following formula.

$$u_j = F y_j \qquad \text{[Math. 9]}$$

K is the number of vocabulary words of vocabulary words Φ' for predicted output text. In the case of the number of vocabulary words being equal for both the input text and the predicted output text such as in automatic abstraction or dialogue text generation of the present embodiment (conversion is performed within the same language), K=N results. On the other hand, in the case of the number of vocabulary words differing between the input text and the generated text such as in translation, K is determined based on the number of vocabulary words of vocabulary words c' for the predicted output text (in other words, the language to which translated). Note that $y_j$ here may be assumed to express a string of predicted output text of the corresponding processing unit by a K-dimensional vector similar to xj. For example, in the case of the predicted output text $\hat{y}_j$ corresponding to the k-th vocabulary word in the set of vocabulary words Φ', vector $y_j$ becomes a K-dimensional one-hot vector of which the k-th element is 1 and all other elements become 0.

The process of generating the hidden state $\bar{z}_j$, from the hidden states $h_1, \ldots, h_I$ generated by the encoder and $z_j$, in other words, the arithmetic operation of NN4 of FIG. 10, is represented as below.

[Math. 10]

$$\bar{z}_j \leftarrow \sum_{i=1}^{I} p_i h_i \quad (6)$$

$$p_i = \frac{\exp(f(h_i, z_j))}{\sum_{i'=1}^{I} \exp(f(h_{i'}, z_j))} \forall i$$

$$f(h_i, z_j) = h_i U^{(a)} z_j$$

That is, $\bar{z}_j$ can be referred to as a vector generated by placing more importance on hidden states $h_i$ of high similarity with $z_j$. Here, $U^{(a)}$ is a matrix of H×H dimension configured by parameters specifying the neural network of NN3. Here, $p_i$ is known as weights of an attention mechanism (Attention Mechanism). Although the method using $p_i$ as alignment, i.e., the alignment information of the input text and the predicted output text, is conventionally known, because there are many values of pi that are not 0, pi is known to function poorly as information specifying a part in the input text (processing unit) that contributed to a part of the predicted output text. Therefore, in the present embodiment, as alignment information more explicit than pi and easily grasped by the user, $\hat{x}_j$ is generated by the process below.

Next, the process regarding determining $\hat{y}_j$ and $\hat{x}_j$ from the hidden state $\bar{z}_j$ is specifically described. First, with the inputting of the hidden state $\bar{z}_j$ into the neural network, $o_j^{(t)}$ and $o_j^{(s)}$ are generated. This calculation is represented by the formula below.

[Math. 11]

$$o_j^{(t)} \leftarrow W^{(t)} \bar{z}_j$$

$$o_j^{(s)} \leftarrow W^{(s)} \bar{z}_j \quad (5)$$

Here, $W^{(t)}$ and $W^{(s)}$ are parameters of the neural network (NN5 in FIG. 10) and are respectively matrices of dimensions K×H and N×H. In the present embodiment, for each parameter, it is assumed that a previously learned value is set. Here, $o_j^{(t)}$ and $o_j^{(s)}$ are expressed as below.

[Math. 12]

$$o_j^{(t)} = (o_{j,1}^{(t)}, o_{j,2}^{(t)}, \ldots o_{j,K}^{(t)})^T \quad (3)$$

[Math. 13]

$$o_j^{(s)} = (o_{j,1}^{(s)}, o_{j,2}^{(s)}, \ldots, o_{j,N}^{(s)})^T \quad (4)$$

are. Here, the superscript letter T represents the transpose of the matrix or vector. $o_{j,k}^{(t)}$ in Formula (3) represents the possibility (score) of the k-th vocabulary word in vocabulary words Φ' being selected, as the predicted output text of the processing unit that is the j-th from the first. Additionally, $o_{j,n}^{(s)}$ represents the score of the n-th vocabulary word in vocabulary words Φ serving as the source when generating the predicted output text of the processing unit that is the j-th from the first.

Here, the decoder predicts $o_j^{(t)}$ of the output side (t) and $o_j^{(s)}$ of the input side (s) using $\bar{z}_j$. $o_j^{(t)}$ and $o_j^{(s)}$ being prediction results represent same meanings with respect to predicted output text and input text, and correspond to processes determining alignment. The predicted output $y_j$ of the j-th processing unit is a K-dimensional one-hot vector of which the element, corresponding to the element number k of the largest value in the elements of $o_j^{(t)}$, is 1 and of which all others are 0. Additionally, the predicted output text $\hat{y}_j$ is determined according to the formula below.

[Math. 14]

$$\hat{y}_j \leftarrow v_{\hat{k}}^{(t)} \quad (7a)$$

$$\hat{k} \leftarrow \operatorname*{argmax}_k \{o_j^{(t)}\}$$

Formula (7a) selects a vocabulary word of vocabulary words Φ' (words and such, predetermined processing units) corresponding to the element number k of largest value from among the elements of $o_j^{(t)}$. $v^{(t)}$ is a vector of strings in which the strings (text) of vocabulary words of vocabulary words Φ' are arrayed from first to K-th, and $v_{\hat{k}}^{(t)}$ represents the string that is the ^k-th element of $v^{(t)}$. (This is for example, $v_1^{(t)}$="Today", $v_2^{(t)}$="Diet", and such.)

Additionally, text $\hat{x}_j$ corresponding to $x_j$ representing the processing unit of the input text, which becomes the source of generating the predicted output text $\hat{y}_j$ of the j-th processing unit, is determined by the formula below.

[Math. 15]

$$\hat{x}_j \leftarrow v_{\hat{n}}^{(s)} \quad (7b)$$

$$\hat{n} \leftarrow \operatorname*{argmax}_n \{o_j^{(s)}\}$$

Formula (7b) selects a vocabulary word of vocabulary words Φ (words and such, predetermined processing units) corresponding to the element number n of largest value from among the elements of $o_j^{(s)}$. $v^{(s)}$ is a vector of strings in which the strings (text) of vocabulary words of vocabulary words Φ are arrayed from first to N-th, and $v_{\hat{n}}^{(s)}$ represents the string that is the ^n-th element of $v^{(s)}$.

Note that a case in which plural processing units of input text corresponding to $\hat{y}_j$ may be considered. In the case in which such plural units are to be output, instead of the argmax function above, a function returning top R element numbers with the highest value, or a function returning element numbers of which the value is greater than or equal to a given threshold R, may be used. It may be noted that in the case of no need to output processing units of input text becoming the source of generating the predicted output text, it is not required to execute the calculation of (7b) for selecting vocabulary words.

In this manner, the decoder repeats the process of outputting $\hat{y}_j$ for the number of times needed (for example, until a symbol (EOS and such) representing end-of-sentence is output) and ultimately outputs, as the predicted output text, strings in which $\hat{y}_j$ are sequentially arrayed from j=1 to J. Additionally, $\hat{x}_j$ is output as alignment information (alignment), for $\hat{y}_j$, specifying which is the part of the input text from which $\hat{y}_j$ is generated.

<Learning Device 130>

In the above-described text generation process, it was assumed that each parameter of the neural network was set to a value learned beforehand. Below, the learning device 130 for learning the value of each parameter of the neural network is described in detail.

The learning device 130, using data for learning prepared beforehand, learns the value of each parameter of the network used in the analyzing unit 120 of the text generation device 100.

Here, the set of learning data is represented by Ω. Additionally, each of the learning data is configured by an (X,Y) pair of First Natural Language Text X and Second Natural Language Text Y in accordance with a specified purpose corresponding to the First Natural Language Text X. In other words, for example, in the case of M units of learning data, Learning Data Ω

$$\Omega = \{(X_m, Y_m)\}_{m=1}^{M} \quad \text{[Math. 16]}$$

can be described as above. In this case, $(X_m, Y_m)$ represents m-th data in the learning data. Here, the Second Natural Language Text $Y_m$ is, for example, abstracted text corresponding to First Natural Language Text $X_m$ if automatic abstraction, text translated into the target language corresponding to n First Natural Language Text $X_m$ if machine translation, and correct response text corresponding to First Natural Language Text $X_m$, if dialogue text creation.

The optimization of the parameters of the neural network can generally be expressed as a solution of a minimization problem of the objective function below.

[Math. 17]

$$\hat{\Psi} = \underset{\Psi}{\operatorname{argmin}}\{L(\Psi, \Omega)\} \quad (8)$$

Where, $\Psi$ represents the set of all parameters of the neural network, specifically, including E, $W_1$, $W_2$, $W_3$, $W_4$, $V_1$, $V_2$, $V_3$, $V_4$, $b_1$, $b_2$, $b_3$, $b_4$, F, $W^{(t)}$, $W^{(s)}$, $U^{(a)}$. Additionally, represents the set of optimized parameters obtained as a result of optimization. Additionally, L is generally called a loss function. Here, the arguments of the Loss Function L are $\Psi$ and $\Omega$. In other words, the purpose of the learning device 130 is to update the values of each parameter included in $\Psi$, such that the values of the Loss Function L are as small as possible.

Figure 6:
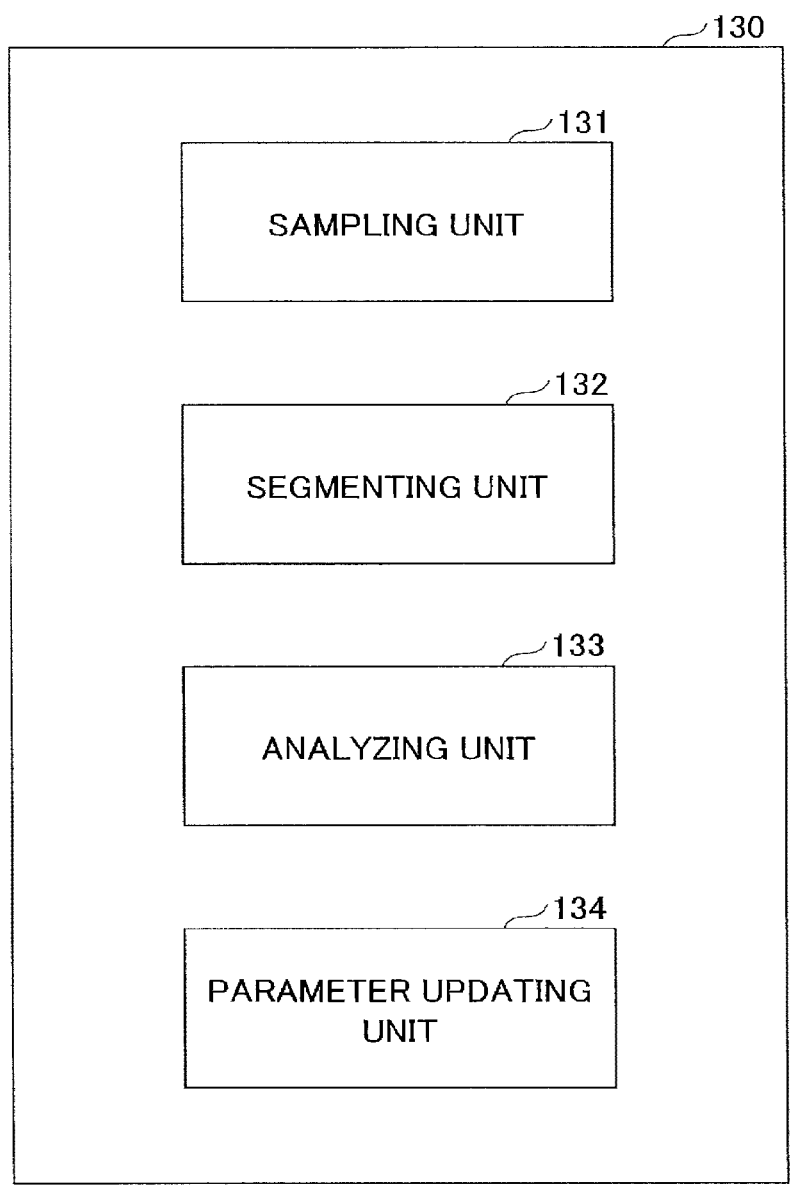
FIG. 6 is a block diagram illustrating a configuration of a learning device according to the embodiment of the present disclosure.

More specifically, the learning device 130, as illustrated in FIG. 6, includes a sampling unit 131, a segmenting unit 132, an analyzing unit 133, and a parameter updating unit 134.

The sampling unit 131 extracts 1 pair of learning data $(X_m, Y_m)$ from the set of learning data Ω.

The segmenting unit 132 segments the extracted First Natural Language Text $X_m$ into strings of predetermined processing units. This process and the size of the processing unit are the same as in the segmenting unit 110 of the text generation device 100.

The analyzing unit 133 generates the predicted result $\hat{Y}_m$ of the Second Natural Language Text from the First Natural Language Text $X_m$ using the neural network. Here, the neural network used in the analyzing unit 133 is same as in the analyzing unit 120, and the specific process generating the predicted result $\hat{Y}_m$ of the Second Natural Language Text from the First Natural Language Text $X_m$ is also the same as in the analyzing unit 120. However, there is a difference with respect to the point that each parameter of the neural network is before the learning. At the time of first execution, an appropriate value is set for each parameter, and the values of the respective parameters are repeatedly updated over the course of the learning process of the learning device 130.

The parameter updating unit 134 calculates values of the loss function calculated based on the predicted result $\hat{Y}_m$ of the Second Natural Language Text output from the analyzing unit 133 and the Learning Data $(X_m, Y_m)$, and determines whether to update a parameter in accordance with the result or to terminate the learning process. For example, in the case of the value of the loss function being greater than or equal to a previously established threshold, the process is repeated returning to the sampling unit 131 after sequentially updating parameters of the neural network in accordance with the value of the loss function. Additionally, if the value of the loss function becomes less than the previously established threshold, the value of each parameter of the current neural network is output and the learning process is terminated. The values of the parameters that are output are set in the neural network of the learning device 130, and a functionally enabled state as a trained neural network is attained. Here, in the case of the value of the loss function being greater than or equal to the predetermined threshold, the parameter update process is performed assuming that convergence has not yet been attained, and if the value of the loss function is less than the predetermined threshold, the learning process is completed with determination of having attained convergence. However, the method of determining convergence is not limited to this, and another convergence determination method may be adopted, for example, a configuration such as the parameter updating process being performed if a predetermined number of repetitions has not been attained and the learning process being terminated on attaining the predetermined number of repetitions.

[Parameter Learning Process]

Figure 11:
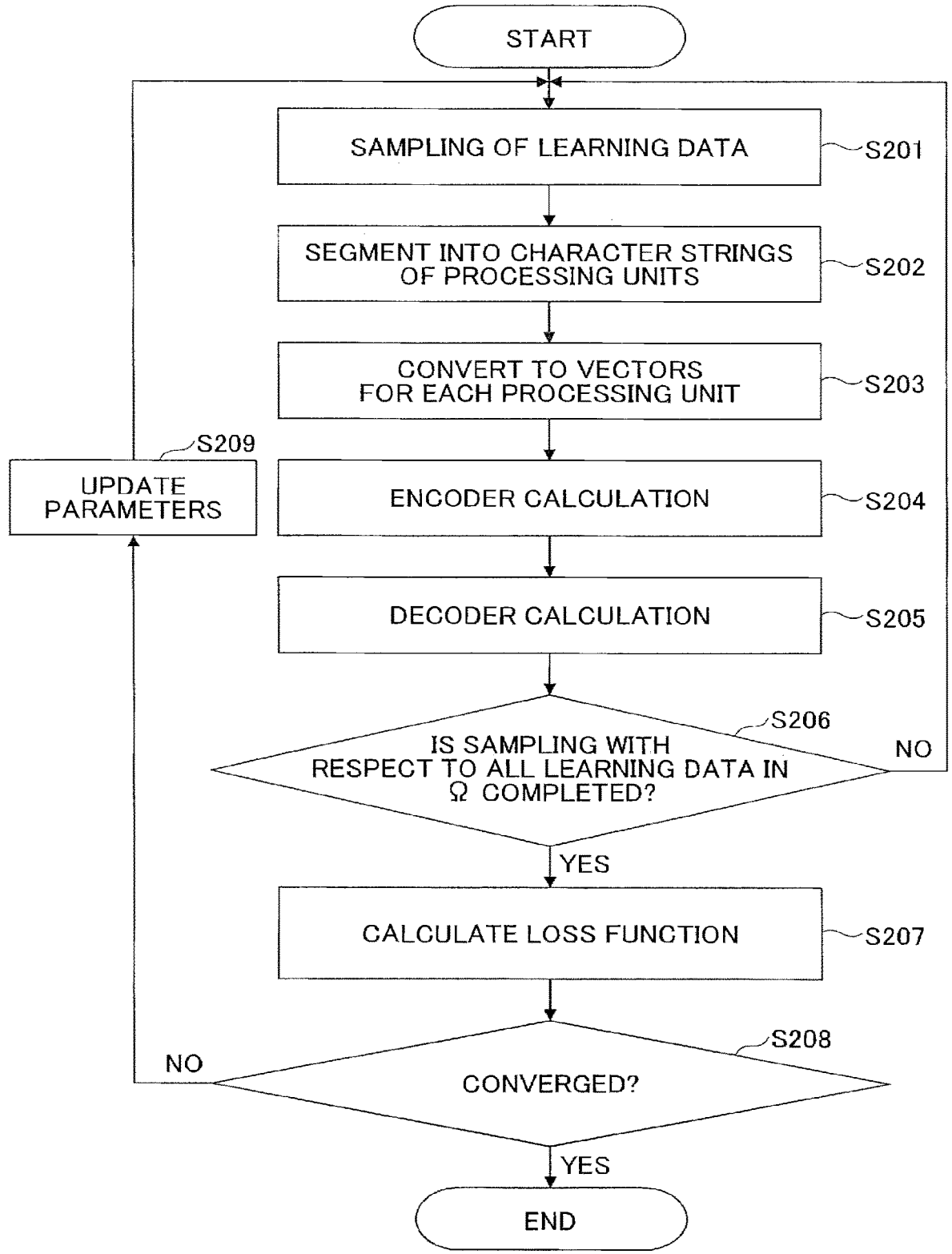
FIG. 11 is a flowchart illustrating a parameter learning process according to the embodiment of the present disclosure.

Next, referring to FIG. 11, the parameter learning process using the learned neural network according to the embodiment of the present disclosure is described.

FIG. 11 is a flowchart illustrating a parameter learning process according to the embodiment of the present disclosure. The process, as described in detail below, is executed by the learning device 130 that has received the set of Learning Data Ω, more specifically, by the processor of the learning device 130.

In Step S201, the learning device 130 selects one learning data $(X_m, Y_m)$ from the set of Learning Data Ω.

From Step S202 to S205, with learning data $X_m$ selected in Step S201 as input text, performing the same process as in the above-described text generation process from Steps S101 to S104, predicted output text $\hat{Y}_m$ is generated.

In Step S206, the learning device 130 repeats the text generation process returning to Step S201, until the above-described $\hat{Y}_m$ are generated for all of the learning data in the set of Learning Data Ω. When the predicted output text for all of the learning data is obtained, Step S207 is executed.

In Step S207, the learning device 130 calculates the loss function expressing the correctness of the predictions from the parameters of the current neural network, using the set of Learning Data Ω and the predicted output text $\hat{Y}_m$ (m=1, 2, . . . , M). In a model corresponding to a conventional method proposed in the above-described Thang Luong, et al., a loss function as below is used.

[Math. 18]

$$L(\Psi, \Omega) = -\sum_{(X_m, Y_m) \in \Omega} \log(P(Y_m \mid X_m, \Phi)) = -\sum_{(X_m, Y_m) \in \Omega} \sum_j \log(P(y_j^{(m)} \mid X_m, \Psi)) \quad (10)$$

Here, $y_j^{(m)}$ is the j-th processing unit of correct output text $Y_m$ given as learning data. Here, $P(y_j^{(m)}|X_m, \Psi)$ represents the probability of correct $y_j^{(m)}$ being output as the predicted output text, in the case of $X_m$ being input into the neural network of current parameters $\Psi$.

With respect to the above, in the embodiment of the present disclosure, in place of the loss function of Formula (10), the loss function of below is used. This has an added term for estimating processing units in the input text corresponding to respective processing units $y_j^{(m)}$ of the predicted output text in Formula (10).

[Math. 19]

$$L(\Psi, \Omega) = \\ -\sum_{(X_m, Y_m) \in \Omega}\left(\sum_j \log(P(y_j^{(m)} | X_m, \Psi)) + \log(P(\tilde{X}_m | X_m, Y_m, \Psi))\right) \quad (14)$$

Here, the added second term represents the probability of text ¯X, which is the source from which the corresponding output text $Y_m$ is generated, being predicted as the text that is the generation source, at the time of output text $Y_m$ being generated from input text $X_m$, by the neural network set with the current parameters $\Psi$. Therefore, in the case of the prediction of ¯X being completely correct, the value of this second term becomes 0. This added second term, for example, may be calculated as per below.

[Math. 20]

$$P(\tilde{X}_m | X_m, Y_m, \Psi) = \exp\left(-\frac{\|\tilde{o}_m - \tilde{x}_m\|}{C}\right) \quad (15)$$

In Formula (15), C is a parameter set beforehand and is taken as any natural number. Because C has an effect of determining the strengths of the first term and of the second term in Formula (14), the value of C may be large in the case of the first term being valued more strongly, and the value of C may be small in the case of the second term value being valued more strongly. Note that ¯$o_m$ and ¯$x_m$ are calculated by the formula below.

[Math. 21]

$$\tilde{o}_m = \sum_{j=1}^{J} o_j^{(s)} \quad (16a)$$

$$\tilde{x}_m = \sum_{i=1}^{I} x_i \quad (16b)$$

Formula (16a) and Formula (16b) respectively represent the occurrence frequency of each vocabulary word (word) in the input text that is the generation source of the predicted output text, and occurrence frequency of each vocabulary word (word) in the input text $X_m$. Note that when J is taken as the number of processing units of generated predicted output text, J<I is assumed. Thereupon for the lengths of $o^{(s)}$ and x to be even, $o_j^{(s)}$ may be such that there is an I number of estimations. For example, for j=J and thereafter (j=J+1, ..., I) in Formula (16a), $o_j^{(a)}$ (j=J+1, ..., I) can be calculated by inputting at each instance special symbols <pad>, as u that is input into the decoder.

Finally, by substituting Formula 15 into Formula 14, the loss function is expressed as below.

[Math. 22]

$$L(\Psi, \Omega) = -\sum_{(X_m, Y_m) \in \Omega}\left(\sum_j \log(P(y_j^{(m)} | X_m, \Psi)) + \frac{1}{C}\|\tilde{o}_m - \tilde{x}_m\|\right) \quad (17)$$

In the case of the predicted result by the neural network matching the correct data, ¯$O_m$ and ¯$x_m$ become equal, and the second term of Formula (17) becomes 0. Conversely, as the predicted result deviates from the correct data, the difference between ¯$O_m$ and ¯$x_m$ becomes greater, and the value of the loss function becomes greater. In other words, it can be said that the second term of Formula (17) is a measure representing the correctness of the alignment information (alignment) output as the predicted result.

Generally, in learning data prepared for learning, there are many cases of correct data for alignment relationships, representing which part of the first natural language text corresponds to which part of the second natural language text, not being given. This is because the cost by human work of giving correct information in relation to alignment is extremely high. Therefore, in conventional learning, it has been difficult to incorporate a measure of alignment correctness in the loss function.

In contrast, according to the loss function of Formulas (14) or (17), parameters of the neural network can be learned, considering comprehensively a first term that is a measure representing correctness of output text output as a predicted result and a second term that is a measure representing the correctness of alignment information (alignment) that is output as a predicted result. By $o_j^{(s)}$ (¯X) being obtained as output of the decoder of the present disclosure, this becomes possible for the first time. Even if predicted output text using terms or expressions not included in the input text is generated, if the vocabulary words ¯$o_m$ of the input text that are the sources of generating the predicted output text are close to the vocabulary words ¯$x_m$ of the input text, text generation can be evaluated as having been performed appropriately. That is, in a neural network allowing for rewording and the like, it is possible to more suitably evaluate prediction accuracy, and as a result, it becomes possible to learn a neural network of higher prediction accuracy than in the conventional.

An embodiment of the present invention has been described as above; however, the present invention is not limited to the above-described specific embodiment, and various variations and modifications may be made within the scope of the gist of the present invention recited in the scope of the patent claims.

The present application is based on and claims priority to Japanese patent application No. 2018-034781 filed on Feb. 28, 2018, the entire contents of which are hereby incorporated by reference.

DESCRIPTION OF SYMBOLS

100 Text generation device
110 Input Unit
120 Analyzing Unit
130 Learning Device

What is claimed is:
1. A device comprising:
a storage that stores a trained neural network into which first natural language text is input and that is trained to output second natural language text and alignment information, the second natural language text being in accordance with a predetermined purpose corresponding to the first natural language text, and the alignment information indicating, for each part of the second natural language text, which part of the first natural language text is a basis of information for generation; and a hardware processor that, when reading and executing the trained neural network:
  inputs text into the trained neural network; and
  outputs a predicted result of output text in accordance with a predetermined purpose, and alignment information indicating, for each part of the predicted result of the output text, which part of the input text is a basis of information for generation.

2. The device according to claim 1, wherein the trained neural network, when read and executed by the hardware processor:
  converts input text into intermediate states;
  generates the predicted result of the output text for each processing unit, sequentially from a first processing unit of the output text, with the intermediate states as input; and
  outputs a predicted result of a j-th processing unit and information specifying a processing unit in the input text used in generating the predicted result of the j-th processing unit, using hidden states obtained from converting a predicted result of a j−1-th processing unit of the output text, and the intermediate states output from the encoding unit.

3. A non-transitory computer-readable recording medium having a program embodied therein causing a processor to read and execute the trained neural network of the device according to claim 1.

4. A device comprising:
  a storage that stores a neural network into which first natural language text is input and that outputs second natural language text and alignment information, the second natural language text being in accordance with a predetermined purpose corresponding to the first natural language text, and the alignment information indicating, for each part of the second natural language text, which part of the first natural language text is a basis of information for generation; and
  a hardware processor that, when reading and executing the neural network:
    inputs text for learning into the neural network;
    outputs a predicted result of output text for learning and alignment information, with respect to each of learning data given beforehand consisting of pairs of the input text for learning and correct output text for learning; and
    updates each parameter of the neural network, in accordance with a value of a loss function calculated based on the predicted result of the output text for learning and the alignment information.

5. The device according to claim 4, wherein the loss function is characterized by being calculated such that a value of a loss function becomes smaller in a case of a degree of similarity between a first occurrence frequency and a second occurrence frequency being high, than in a case of the degree of similarity being low, the first occurrence frequency being an occurrence frequency of each vocabulary word of a first natural language used in generating the predicted result of the output text for learning, and the second occurrence frequency being an occurrence frequency of each vocabulary word of the first natural language in the input text for learning.

6. The device according to claim 4, wherein the neural network, when read and executed by the hardware processor:
  converts input text for learning into intermediate states;
  generates the predicted result of the output text for learning for each processing unit, sequentially from a first processing unit of the predicted result of the output text for learning, with the intermediate states as input; and
  outputs a predicted result of a j-th processing unit and information specifying a processing unit in the input text used in generating the predicted result of the j-th processing unit, using hidden states obtained from converting a predicted result of a j−1-th processing unit of the output text, and the intermediate states.

7. A non-transitory computer-readable recording medium having a program embodied therein causing a processor to read and execute the neural network of claim 4.

8. A method including:
  inputting text into a trained neural network; and
  of outputting a predicted result of output text in accordance with a predetermined purpose, and alignment information indicating, for each part of the predicted result of the output text, which part of the input text is a basis of information for generation,
  wherein the trained neural network, into which first natural language text is input, is trained to output second natural language text and alignment information, the second natural language text being in accordance with a predetermined purpose corresponding to the first natural language text, and the alignment information indicating, for each part of the second natural language text, which part of the first natural language text is a basis of information for generation.

9. A method including:
  inputting into a neural network text for learning, with respect to each of learning data given beforehand consisting of pairs of the input text for learning and correct output text for learning;
  outputting a predicted result of output text for learning and alignment information; and
  a step of updating each parameter of the neural network, in accordance with a value of a loss function calculated based on the predicted result of the output text for learning and the alignment information,
  wherein the neural network, into which first natural language text is input, outputs second natural language text and alignment information, the second natural language text being in accordance with a predetermined purpose corresponding to the first natural language text, and the alignment information indicating, for each part of the second natural language text, which part of the first natural language text is a basis of information for generation.

* * * * *